April 7, 1936.                W. A. GARRATT                2,036,626
                                TRANSMISSION
                            Filed March 8, 1935              2 Sheets-Sheet 1
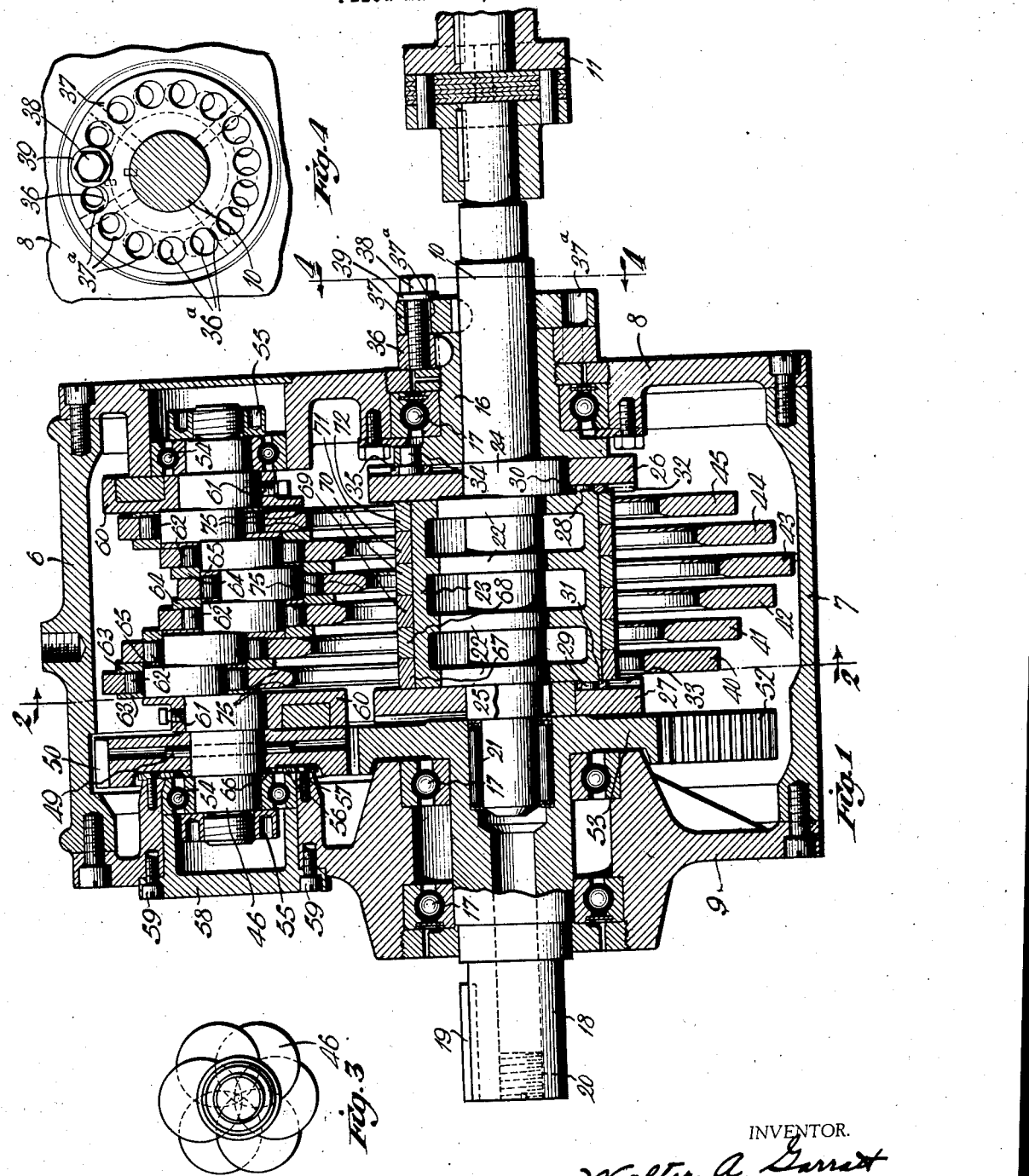
INVENTOR.
Walter A. Garratt
BY
Wood & Wood
ATTORNEYS April 7, 1936. W. A. GARRATT 2,036,626
TRANSMISSION
Filed March 8, 1935 2 Sheets-Sheet 2
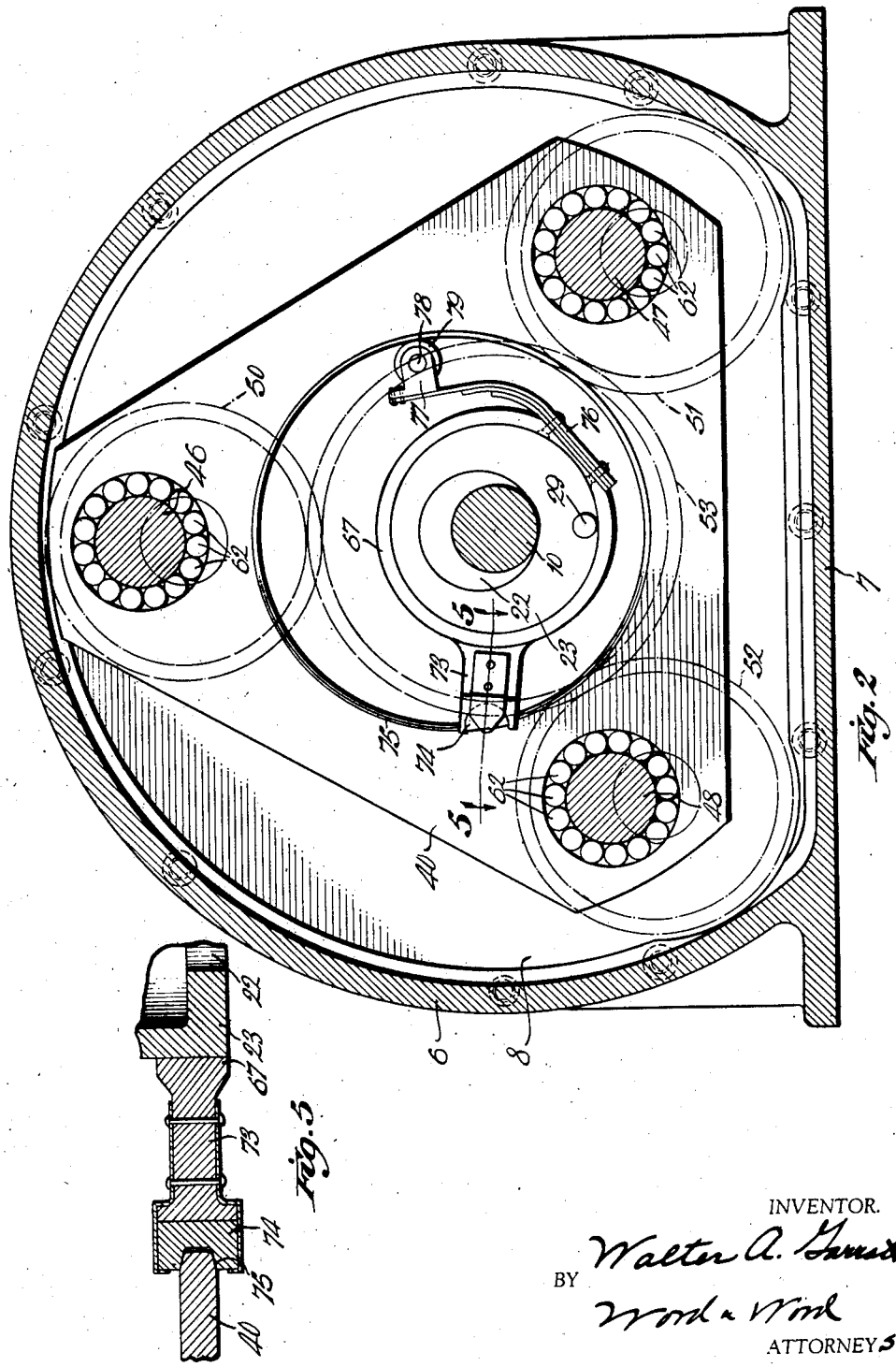
INVENTOR.
Walter A. Garratt
BY
Wood & Wood
ATTORNEYS Patented Apr. 7, 1936

2,036,626

UNITED STATES PATENT OFFICE 2,036,626

TRANSMISSION

Walter A. Garratt, Covington, Ky.

Application March 8, 1935, Serial No. 10,024

18 Claims. (Cl. 74—117)

This invention relates to improvements in transmissions, particularly variable speed transmissions of the character disclosed in my copending application Serial Number 632,407, filed September 9, 1932, of which this application is a continuation in part.

The construction disclosed in the co-pending case incorporates a variable throw eccentric system surrounded by a fixed throw eccentric system with motion from one to the other accomplished through members interposed between them, the relative speed of one system to the other being relative to the throw of the variable throw system.

It is the object of the present invention to provide an improved transmission of this character in which the mechanism operates with less friction, provides a smoother flow of power in which the parts of the clutching mechanism are more rugged, and by means of which a wider range of output speeds may be delivered.

Other objects and further advantages will be more fully apparent from a description of the accompanying drawings, in which:

Figure 1 is a vertical cross sectional view of the machine taken longitudinal of the main axis thereof.

Figure 2 is a cross sectional view taken on line 2—2, Fig. 1, certain of the parts being omitted so that the structure shown may be more clearly illustrated.

Figure 3 is an end view of a crank shaft.

Figure 4 is a cross sectional view taken on line 4—4, Fig. 1.

Figure 5 is a section on line 5—5, Fig. 2.

Power may be applied at either end of this machine and taken off at the other, but in the preferred operation of this disclosure the drive shaft is shown at 10.

The housing or frame for the mechanism is composed of three members, a central tubular member 6, provided with a base 7, an input end plate 8 and an output end plate 9. The drive shaft 10 is provided with a suitable coupling 11 for attachment to a motor or other source of power and is rotatably mounted in a sleeve 16 which is journalled in ball bearings 17 in the end plate 8 of the frame. The driven shaft 18 is provided with a key 19 for power take-off. The shaft 18 is hollow and is provided with an oil stop plug 20. It is journalled in ball bearings 17 in the end plate 9. The inner end of the driven shaft 18 contains the roller bearing 21 which forms a journal for the inner end of the drive shaft 10, so that the two shafts have a common axis, which is hereafter called the main axis.

On the drive shaft 10 between its journals are formed eccentric lobes 22, upon which lobes is rotatably mounted an eccentric bushing or cylinder 23. The eccentric bushing is hollowed out between the lobes for lessening its weight, and its eccentricity to its bore is the same as the eccentricity of the lobes 22 to the main axis. It is evident that rotating the bushing 23 relative to the lobes 22 varies the eccentricity of the bushing 23 to the main axis through a range between zero and maximum eccentricity and the maximum eccentricity is twice the eccentricity of the lobes 22 to the main axis.

Adjacent to the outside lobes 22 are two other eccentric lobes 24 and 25, the first formed on the shaft 10 and the second constituted by a separate piece but fixed to the shaft by a key. These lobes 24 and 25 have the same amount of eccentricity as the lobes 22 but are positioned in the opposite direction from the lobes 22. The dimension of each of the lobes 24 and 25 measured parallel to the main axis is twice that of the similar dimension of each lobe 22 so that the two lobes 24 and 25 counterbalance the four lobes 22.

Rotatably mounted on the lobes 24 and 25 are counterweights 26 and 27 which are connected to the bushing 23 by the pins 28 and 29. These pins fit rotatively in the shoes 30 and 31, slidably engaged in radial grooves 32 and 33 of the counterweights 26 and 27. These counterweights 26 and 27 are so designed that their centers of mass are eccentric to their bores by the same amount as the bushing 23 is eccentric to its bore. The directions of eccentricity of the bushing and of the counterweights are opposite to each other. The two counterweights are of substantially the same weight as bushing 23 and associated parts. When the bushing 23 is rotated relative to the lobes 22, the counterweights are rotated relative to the lobes 24 and 25. Therefore, the lobes 22 are counterbalanced by the lobes 24 and 25, and the bushing 23 is counterbalanced by the counterweights 26 and 27, whatever the position of eccentricity of the bushing 23.

The sleeve 16 is flanged at the inner end and in the flange is fixed pin 34 on which a shoe 35 is rotatively mounted. The shoe 35 is slidably mounted in a radial groove in the counterweight 26. The sleeve 16, therefore, has a connection with the bushing 23 through pin 34, shoe 35, counterweight 26, shoe 30, pin 28 and bushing 23. Therefore, rotation of the sleeve 16 relative to shaft 10 will rotate bushing 23 relative to shaft 10 and so change the throw of the eccentric bushing 23 relative to the main axis. This throw is maintained constant if there is no rotation of the sleeve 16 relative to shaft 10.

Outside of the end plate 8, collar 36 is keyed to the sleeve 16, and a collar 37 is keyed to the shaft 10. The collar 37 has in it a plurality of holes 37a, in this case 15, disposed parallel to the main axis disposed equidistant from each other adjacent to the circumference. The collar 36 has sixteen holes 36a parallel to the main axis disposed equidistant from each other and their centers are the same distance from the main axis as the holes in collar 37. The holes in collar 36 are threaded to receive the bolt 38 which is fitted with washer 39, whereas the holes in 37 are sufficiently larger in diameter than the bolt 38 so that whatever position of the sleeve 16 relative to shaft 10 is selected or, in other words, whatever throw of the eccentric bushing 23 is selected there will be found one or more holes in one collar nearly enough coaxial with a hole in the other collar to allow the bolt 38 to be entered and tightened so that the collars cannot rotate relative to each other and the eccentric throw is thereby maintained. To change the throw the bolt 38 must be taken out and the collars rotated relative to each other.

Surrounding the bushing 23, but not touching it, are six plates 40, 41, 42, 43, 44 and 45, which are duplicates of each other. The plates are suspended eccentric to the main axis by three crank shafts 46, 47 and 48, duplicates of each other, extending through all of them. Each crank shaft has six crank portions of equal throws, one in the plane of each plate, disposed symmetrically about the crank shaft axis as shown in Figure 3. The length of the throw is preferably more than the maximum eccentricity of the bushing 23 to the main axis.

Each crank shaft has a gear secured thereto by a pin 49 near the driven shaft end, respectively gears 50, 51 and 52. These three gears are meshed with a gear 53 formed on the driven shaft 18 concentric to the driven shaft. These gears are so meshed that crank portions of the three crank shafts in the same plane extend always in exactly the same direction from the crank shaft axis or, in other words, the radii of eccentricity of any three crank pins in the same plane are always parallel to each other. This arrangement constrains the six plates so that they are always disposed symmetrically about the main axis. The movement of each plate is limited to pseudo-rotation (wherein the body does not rotate on its center but the center revolves about another point), and force applied to move any one moves all.

The crank shafts are journalled in the end plates 8 and 9 in ball bearings 54. A nut 55 on each crank shaft end holds the inner race of the adjacent ball bearing against an appropriate shoulder of the crank shaft. At one end of each crank shaft the outer race of the ball bearing is held in place by a ring 56 held against the end plate 9 by screws 57 and a thrust cap 58 held against the end plate 9 by screws 59. The vibration which tends to result from the rotation of the crank shafts together with the mass of the pseudo-rotating eccentric plates is substantially nullified by the crank shaft counterweights 60 loaded with lead and located by set screws 61. The crank portions of the crank shafts are journalled in the eccentric plates by roller bearings 62 retained in position by washers and spacers 63, 64 and 65. A spacer washer 66 is inserted between ball bearing 54 and the hub of the gear 50.

Fitting rotatively about the eccentric bushing 23 are six driving collars, duplicates of each other, 67, 68, 69, 70, 71 and 72, interposed between the bushing 23 and the six eccentric plates 40, 41, 42, 43, 44 and 45, one for each plate in substantially the same plane as its corresponding plate. The driving collars as shown by 67 in Figure 2, have projections 73 in the end of each of which is fitted rotatively a wedge member 74. The description of the one collar 67 and its associated parts is the same for the other collars 68, 69, 70, 71 and 72 with their associated parts, which are not shown. The surface of the wedge member 74 toward the main axis has its bearing in the projection 73 of the driving collar 67 and on its opposite surface is formed a wedge shaped groove bearing against the annular wedge surface 75 formed at the circumference of the central hole in the eccentric plate 40.

On one side of the driver collar 67 is attached a spring 76 lying in the same plane as the driver collar and its associated eccentric plate. To the outer end of the spring is attached a clevis 77 in which is mounted, rotatively on a pin 78, a roller 79 which bears against the circumference of the central hole of the eccentric plate 40. Now the distance from the center of the wedge shaped surface of the wedge member 74 to the center of the driver collar which is the center of the bushing 23 is less than the sum of the radius of the central hole of the eccentric plate and the eccentricity of the eccentric plate to the main axis and more than the difference.

If the drive shaft is rotated and the bushing 23 has zero eccentricity to the main axis there will be no motion imparted to the driver collar. If the bushing 23 is set at any selected eccentricity to the main axis, then the bushing 23 will press upon the driver collar in the region of the projection 73 when the movement of the center of the bushing in its path about the main axis is in the direction of the wedge member 74 and will press through the spring 76 against the roller 79 when its movement is in the other half of its path. When the eccentric bushing presses through the driver collar 67 against the wedge member 74 the driver collar and wedge member become a driving connection between the bushing 23 and the eccentric plate 40 and the rotative movement of the eccentric bushing is translated to pseudo-rotation of the eccentric plate. When the driving stroke is completed the bushing 23 begins to press against the side of the collar opposite to the wedge member 74 which causes the roller 79 to press against the plate 40.

Because of the relation of the center of the eccentric plate 40 to the center of the eccentric bushing 23, the pressure on the roller 79 causes the driver collar 67 to rotate on the center of the bushing 23, thus maintaining contact of the wedge member 74 with the eccentric plate 40. Rotation of the driving collar 67 continues until the pressure of the bushing 23 on the driver collar crosses back to the region of the projection 73 when driving connection is formed again.

This action may be better understood if it is remembered that the variable eccentricity of the bushing 23 is always less than the fixed eccentricity of the eccentric plates. In observing the action it is also seen that the center of the bushing 23 never crosses a line drawn through the wedge member 74 and the center of the eccentric plate 40. If now it is remembered that the segments of the bushing 23 lying each in the plane of one eccentric plate have only one direction of eccentricity whereas the directions of eccentricity of the 5 plates are symmetrically distributed around the main axis, then it is evident that some plate is always in position to receive the drive and since movement of one plate causes all to move, continuous motion of pseudo-rotation of the eccentric plates results from continuous rotation of the bushing 23 with the drive shaft 10 and the rate of pseudo-rotation is related to the throw of the eccentric, the drive shaft having a constant speed of rotation.

The pseudo-rotation of eccentric plates obviously causes the same speed of rotation of the three crank shafts and this rotation is transferred through the gears to the driven shaft and the speed of the driven shaft bears a fixed ratio to the speed of pseudo-rotation of the eccentric plates, the same as the ratio of the three crank shaft gears 50, 51 and 52 to the driven shaft gear 53.

Therefore, with a constant rate of rotation of the drive shaft, the rate of rotation of the driven shaft may be varied infinitely from zero to a maximum, which maximum is a ratio of the rate of rotation of the drive shaft determined by the two factors: first, the ratio of the maximum throw of the variable throw eccentric to the throw of the fixed throw eccentric, and second, the ratio of the crank shaft gears to the driven shaft gear.

Having described my invention, I claim:

1. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, cranks rotatably mounted in the frame, said fixed throw eccentric members mounted on the cranks and in driving connection therewith, a driven member journalled in the frame, and gears associated with the cranks and the driven member for communicating motion from the cranks to the driven member.

2. In a device of the class described, a frame, a drive member journalled therein, a variable throw eccentric member associated with the drive member and adapted to be rotated thereby, a plurality of fixed throw eccentric members surrounding the variable throw eccentric member and spaced apart therefrom, said fixed throw eccentric members arranged in symmetrical phase relationship to the variable throw eccentric members, means for communicating motion from the variable throw eccentric member to the fixed throw eccentric members, cranks rotatably mounted in the frame, said fixed throw eccentric members mounted on the cranks and in driving connection therewith, a driven member journalled in the frame, and gears associated with the cranks and the driven member for communicating motion from the cranks to the driven member.

3. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, cranks rotatably mounted in the frame, said fixed throw eccentric members mounted on the cranks and in driving connection therewith, a driven member journalled in the frame, and gears associated with the cranks and the driven member for communicating motion from the cranks to the driven member.

4. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, cranks suspending the fixed throw eccentric members in the frame and maintaining a symmetrical phase relationship between the fixed throw eccentric members and the variable throw eccentric member throughout the operating cycle, a driven member journalled in the frame, and gears associated with the cranks and the driven member for communicating motion from the cranks to the driven member.

5. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, cranks rotatably mounted in said frame for receiving the drive from the fixed throw eccentric members, said fixed throw eccentric members mounted on said cranks, said cranks maintaining a symmetrical phase relationship between the fixed throw eccentric members and the variable throw eccentric member throughout the operating cycle and constraining the motion of the fixed throw eccentric members to pseudo-rotation wherein the members are non-rotative but their centers revolve about an axis, a driven member journalled in the frame, and gears associated with the cranks and the driven member for communicating motion from the cranks to the driven member.

6. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, each interposed member being a driving connection between the variable throw eccentric member and the corresponding surrounding fixed throw eccentric member when the variable throw eccentric member presses upon one part of the interposed member and rotating without driving connection when the variable throw eccentric member presses upon any other part of the interposed member not included in the part first mentioned, clutching elements included in each interposed member bearing against the fixed throw eccentric member coupling the interposed member to the fixed throw eccentric member for movement of the two in one direction only, the clutching elements requiring for clutching only a fraction of the force imparted to the interposed member, cranks rotatably mounted in said frame for receiving the drive from the fixed throw eccentric members, said fixed throw eccentric members mounted on said cranks, said cranks maintaining a symmetrical phase relationship between the fixed throw eccentric members and the variable throw eccentric member throughout the operating cycle and constraining the motion of the fixed throw eccentric member to pseudo-rotation wherein the members do not rotate but their centers revolve about an axis, a driven member journalled in the frame, and gears associated with the cranks and the driven member for communicating motion from the cranks to the driven member.

7. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, each interposed member being a driving connection between the variable throw eccentric member and the fixed throw eccentric member when the variable throw eccentric member presses upon one part of the interposed member and rotating without driving connection when the variable throw eccentric member presses upon any other part of the interposed member not included in the part first mentioned, clutching parts included in each interposed member bearing against the fixed throw eccentric member coupling the interposed member to the fixed throw eccentric member for movement of the two in one direction only, cranks rotatably mounted in said frame for receiving the drive from the fixed throw eccentric members, said fixed throw eccentric members mounted on said cranks for constraining the motion of the fixed throw eccentric members to pseudo-rotation wherein the members do not rotate but their centers revolve about an axis, a driven member journalled in the frame, and gears associated with the cranks and the driven member for communicating motion from the cranks to the driven member.

8. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom and arranged in symmetrical phase relationship to the variable throw eccentric member, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, each interposed member being a driving connection between the variable throw eccentric member and the corresponding surrounding fixed throw eccentric member when the variable throw eccentric member presses upon one part of the interposed member and rotating without driving connection when the variable throw eccentric member presses upon any other part of the interposed member not included in the part first mentioned, clutching elements included in each interposed member bearing against the fixed throw eccentric member coupling the interposed member to the fixed throw eccentric member for movement of the two in one direction only, the clutch elements requiring for clutching only a fraction of the force imparted to the interposed member, cranks rotatably mounted in said frame for receiving the drive from the fixed throw eccentric members, said fixed throw eccentric members mounted on said cranks, said cranks maintaining a symmetrical phase relationship between the fixed throw eccentric members and the variable throw eccentric member throughout the operating cycle and constraining the motion of the fixed throw eccentric members to psuedo-rotation wherein the members do not rotate but their centers revolve about an axis, a driven member journalled in the frame, and gears associated with the cranks and the driven member for communicating motion from the cranks to the driven member.

9. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, push arms having portions surrounding said variable throw eccentric member and internally engaging the fixed throw eccentric members for communicating motion from the variable throw eccentric member to the fixed throw eccentric members, cranks rotatably mounted in the frame, said fixed throw eccentric members mounted on the cranks and in driving connection therewith, a driven member journalled in the frame, and gears associated with the cranks and the driven member for communicating motion from the cranks to the driven member.

10. In a transmission, a driving shaft, a driven shaft, a plurality of plates the centers of which are adapted to revolve around the axes of the driving and driven shaft, crank shafts supporting said plates in symmetrical arrangement about said axes and confining said plates to revolutionary movement, eccentric means driven by said drive shaft, push arms disposed about said eccentric, one in engagement with the inner periphery of each plate, said push arms engaging the inner periphery of said plates at approximately right angles to the crank arm supports for the plates when in driving contact, and means connecting said crank shafts to said driven shaft.

11. In a device of the class described, a frame, a drive member journalled therein, a variable throw eccentric member associated with the drive member and adapted to be rotated thereby, means for varying the throw of the variable throw eccentric member, counterbalances associated with the variable throw eccentric member adapted to balance the variable throw eccentric member whatever its eccentricity, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, cranks rotatably mounted in the frame, said fixed throw eccentric members mounted on the cranks and in driving connection therewith, a driven member journalled in the frame, and gears associated with the cranks and the driven member for communicating motion from the cranks to the driven member.

12. In a device of the class described, a frame, a drive member journalled therein, a variable throw eccentric member associated with the drive member and adapted to be rotated thereby, means for varying the throw of the variable throw eccentric member, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, cranks rotatably mounted in the frame, said fixed throw eccentric members mounted on the cranks and in driving connection therewith, counterbalances associated with the crank members adapted to counteract the forces tending to change the position of the axis of the suspension cranks, a driven member journalled in the frame, and gears associated with the cranks and the driven member for communicating motion from the cranks to the driven member.

13. In a device of the class described, a frame, a drive member journalled therein, a variable throw eccentric member associated with the drive member and adapted to be rotated thereby, means for varying the throw of the variable throw eccentric member, counterbalances associated with the variable throw eccentric member adapted to balance the variable throw eccentric member whatever its eccentricity, a plurality of fixed throw eccentric members surrounding the variable throw eccentric member and spaced apart therefrom, members interposed between the variable throw eccentric member and the fixed throw eccentric members for communicating motion from the variable throw eccentric member to the fixed throw eccentric members, there being one interposed member for each element of the plurality of fixed throw eccentric members and the corresponding surrounded portion of the variable throw eccentric member, the three being in the same plane, cranks rotatably mounted in the frame, said fixed throw eccentric members mounted on the cranks and in driving connection therewith, counterbalances associated with the suspension crank members adapted to counteract the forces tending to change the position of the axis of the cranks, a driven member journalled in the frame, and gears associated with the cranks and the driven member for communicating motion from the cranks to the driven member.

14. In a speed variator, a driving eccentric, means for adjusting the eccentricity of the driving eccentric, a plurality of eccentric bodies having their eccentricities symmetrically disposed about the center of rotation of the driving eccentric, rotatable supports for constraining the eccentric bodies to execute pseudo-rotation about the axis of rotation of the driving eccentric, interposed means for transmitting motion from the driving eccentric to the eccentric bodies, a driven member, and means for transmitting motion from the rotatable supports to the driven member.

15. In a speed variator, a rotatable member, means for adjusting the amplitude of motion of the member to any desired amount within limits, a plurality of pseudo-rotatable members having symmetrical phase relations one with another, mounting elements for constraining the pseudo-rotatable members to execute pseudo-rotation with reference to the axis of rotation of the rotatable member and to maintain proper and constant phase relationship between the several pseudo-rotative members, a plurality of intermediate elements one for each pseudo-rotatable member for transmitting motion from the member to the pseudo-rotatable members, a driven member, and means for transmitting motion from the mounting elements to the driven member.

16. In a speed variator, a driving eccentric, means for adjusting the eccentricity of the driving eccentric, a plurality of eccentric bodies having their eccentricities symmetrically disposed about the center of rotation of the driving eccentric, supports for constraining the eccentric bodies to execute pseudo-rotation about the axis of rotation of the driving eccentric, interposed means for transmitting motion from the driving eccentric to the eccentric bodies, a driven member, and means for transmitting motion from the eccentric bodies to the driven member.

17. In a speed variator, a rotatable member, means for adjusting the throw of said member, a plurality of pseudo-rotatable members having suitable phase relations one with another, mounting elements for constraining the pseudo-rotatable members to execute pseudo-rotation with reference to the axis of rotation of the rotatable member and to maintain proper and constant phase relationship between the several pseudo-rotative members, a plurality of intermediate elements one for each pseudo-rotatable member for transmitting motion from the member to the pseudo-rotatable members, a driven member, and means for transmitting motion from the pseudo-rotatable members to the driven member.

18. In speed varying apparatus, a drive member, a driven member, a first eccentric device rotated by the drive member, a second eccentric device including a plurality of elements having a symmetrical phase relationship to the first eccentric device and adapted to drive the driven member, a group of members interposed between the first and second eccentric devices for communicating motion from one device to the other, the elements of said second eccentric device surrounding the other eccentric device, there being one interposed member for each element of said second device disposed in the same plane therewith, the first eccentric device having a variable throw, means supporting the elements of the second eccentric device for a fixed throw, a transmission between the fixed throw eccentric device and the driven member, and means for varying the throw of the variable throw eccentric device.

WALTER A. GARRATT.